June 22, 1965 W. STRAUSS 3,189,945
INJECTION MOLDING APPARATUS
Filed March 1, 1962 2 Sheets-Sheet 1

INVENTOR.
WILLIAM STRAUSS
BY
Arthur H. Seidel
ATTORNEY

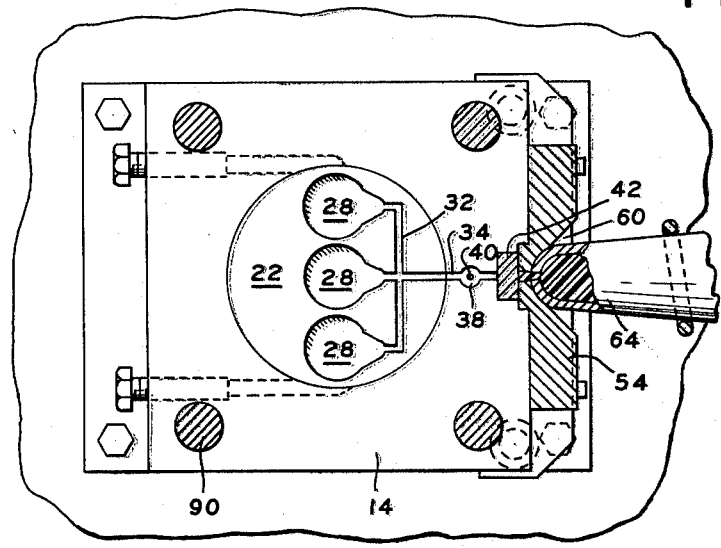

3,189,945
INJECTION MOLDING APPARATUS
William Strauss, Philadelphia, Pa., assignor, by mesne assignments, to Pennsalt Chemicals Corporation, Philadelphia, Pa., a corporation of Pennsylvania
Filed Mar. 1, 1962, Ser. No. 176,735
2 Claims. (Cl. 18—30)

This invention relates to a molding press, and more particularly to an injection molding press for making molded articles from thermoplastic material.

A wide variety of injection molding presses have been proposed heretofore. In a conventional molding press, heated molding material is forced into the die cavity under pressure through a nozzle. The nozzle is generally provided with a valve to prevent injection of molding material except during a certain desired portion of the cycle. Recent developments in this art incorporate a rotating screw within the heater cylinder which is positioned between the hopper and the injection nozzle. The rotating screw accumulates molding material in a fluid state between the valve and the forward end of the screw. The building up of pressure in this location causes the screw to reciprocate rearwardly thereby providing additional space for additional molding material as required by the shot to be injected into the mold cavity.

Heretofore, considerable difficulty has been encountered with a drooling effect. That is, the valve upstream of the injection nozzle tends to leak because of the increased pressures to which it is subjected. Increasing the sealing effect of the valve head has not been entirely satisfactory. In accordance with the present invention, the provision of a valve upstream of the injection nozzle is completely eliminated. In accordance with the present invention, a valve is provided on the lower platen of the molding press. The valving element is in the nature of a sliding gate valve element which cooperates with the solidified cold slug of molding material which forms in the nozzle plate and outlet port of the nozzle. The gate valve element is reciprocably disposed so that its movement is responsive to the opening and closing of the dies.

By providing a valve element which cooperates with a cold slug of molding material as mentioned above, drooling is eliminated. Also, when molding certain material such as nylon, threading of the the molding material and the need for cut off devices for the threading may be eliminated. Since the valving action of the present invention is always in a cold zone as compared with a hot zone in the heater cylinder, the sprue will always be a solid member thereby facilitating the cleaning of the runner and sprue cavity before repeating a cycle.

In the molding presses proposed heretofore, the provision of a valve upstream of the injection nozzle necessitated the provision of a power cylinder to effectuate operation of the valving member and a timing mechanism so that the valve member was in an opened disposition only when the dies are juxtaposed to one another. In this regard, it will be noted that the molding material is injected into the die cavity with sufficient pressure so that it would kill a person subjected thereto. Hence, the dies must be juxtaposed to one another in their closed disposition before the valve member is moved to an opened disposition.

It is an object of the present invention to provide a novel molding press.

It is another object of the present invention to provide a novel injection molding press wherein valving of the molding material is accomplished in a cold zone.

It is another object of the present invention to provide a molding press wherein the solid slug in the nozzle outlet and nozzle plate are utilized to perform a valving function.

It is another object of the present invention to provide a molding press having a valve for controlling the flow of molding material to the die cavity, with such valve incorporating a valving member responsive directly to the opening and closing of the dies.

It is still another object of the present invention to provide an injection molding press which provides solid sprues and eliminates drooling.

Other objects will appear hereinafter.

For the purpose of illustrating the invention there is shown in the drawings a form which is presently preferred; it being understood, however, that this invention is not limited to the precise arrangement and instrumentalities shown.

FIGURE 2 is a view taken along the lines 2—2 in FIGURE 1.

FIGURE 3 is an exploded view of a portion of the present invention in the area of the valving element, with the elements shown being on an enlarged scale.

Referring to the drawing in detail, wherein like numerals indicate like elements, there is shown in FIGURE 1 a molding press designated generally as 10.

Figure 1:
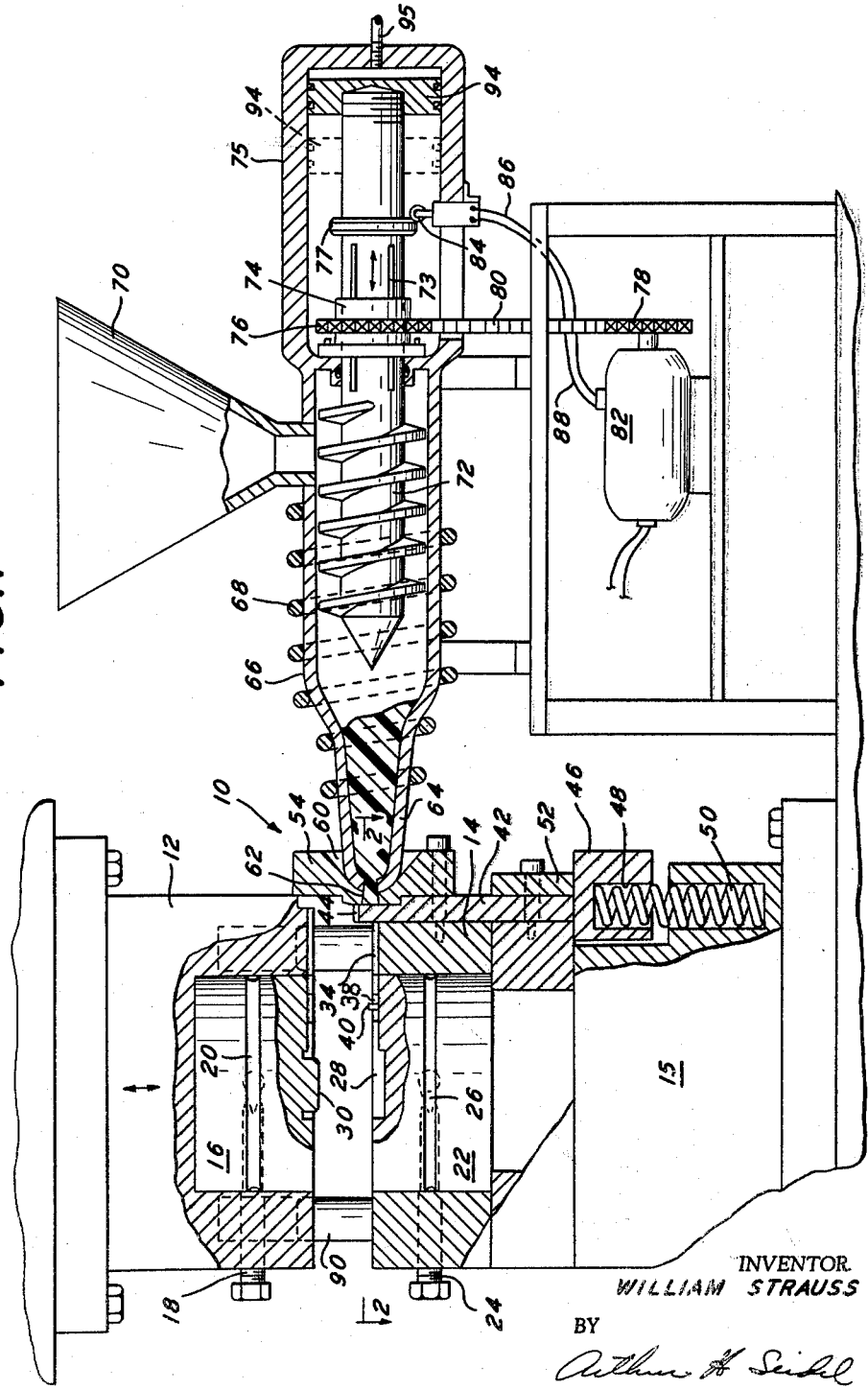
FIGURE 1 is an elevation view of the present invention with a portion thereof shown in section and a portion thereof illustrated schematically.

The molding press 10 comprises a top platen 12 mounted for reciprocatory movement toward and away from a lower fixed platen 14. The top platen 12 is removably secured to mounting structure which is reciprocated in a conventional manner. The lower platen 14 is removably secured to a base portion 15 which is mounted on any convenient supporting surface.

A die 16 is removably secured to the top platen 12 by means of a bolt 18. The bolt 18 is threadedly secured to the top platen 12 and extends into a circumferential groove on the outer periphery of the die 16. A die 22 is removably secured to the platen 14 in a similar manner. Accordingly, a bolt 24 is threadedly secured to the lower platen 14 and extends into a peripheral groove 26 on the outer periphery of the die 22.

The die 22 is provided with a plurality of die cavities 28. The die 16 is provided with a plurality of cores 30. Each core 30 is adapted to enter one of the die cavities 28. Each of the die cavities 28 is interconnected with runners 32 by means of a gate cavity. A sprue cavity 34 extends across the upper surface of the lower platen 14 and the die 22.

The gate cavity, runner cavity 32, and sprue cavity 34 may be semi-circular. The top platen 12 and die 16 may be provided with corresponding semi-circular cavities which mate with the cavities mentioned above.

The sprue cavity 34 is provided with an enlarged area 38 as illustrated in FIGURES 1 and 2. A small pin 40 is disposed within the enlarged area 38 for a purpose to be made clear hereinafter. The lower platen 14 is provided with a recess along a side edge thereof. A gate valve member 42 is slidably disposed within the recess. The upper edge of the valve member 42 is provided with a semi-circular groove 44 which is in line with the sprue 34 in one position of the valve member 42. As shown more clearly in FIGURE 1, the valve member 42 is provided with an enlarged base portion 46. The base portion 46 is provided with a blind cavity 48 which receives one end of a spring 50. The other end of the spring 50 is disposed within a blind cavity in the support 15.

The spring 50 biases the valve member 42 toward the upper platen 12. The sprue on the upper platen 12 is of sufficient length so as to cooperate with the sprue 34 and the groove 44. The upper end of the valve member 42 is in line with a portion of the upper platen 12 so that the valve member 42 is biased downwardly against the effect of the spring 50 when the dies 16 and 22 are in their closed disposition. When the die 16 is moved to the opened disposition illustrated in FIGURE 1, the valve member 42 is biased to the position illustrated wherein the groove 44 is offset with respect to the sprue 34. A guide bracket 52 is removably disposed in a position so as to assist in guiding the reciprocatory movement of the valve member 42.

A nozzle plate 54 is removably secured to the lower platen 14. The nozzle plate 54 is provided with a circular boss 56 on one surface thereof. The boss 56 is adapted to be received within recess 58 on lower platen 14. Valve member 42 has a concave shoulder 59 which abuts the bottom portion of boss 56 in the uppermost position of valve member 42. The cooperation between the boss 56 and the recess 58 assures that the groove 44 will be in line with the lower half of the flow passage 62. The flow passage 62 extends through the boss 56 to the nozzle cavity on the opposite surface of the plate 54. The area of the flow passage 62 tapers toward the cavity 60. The diameter of the flow passage 62 on the valve member side is equal to the radius of the groove 44.

The nozzle cavity 60 is adapted to receive a nozzle 64. The nozzle 64 is provided with a discharge opening in line with the flow passage 62. The discharge opening in the nozzle 64 is tapered in a direction away from the flow passage 62. The nozzle 64 is connected to a heating cylinder 66 having heater coils 68 wrapped therearound. Any one of a wide variety of means may be provided for heating the cylinder 66.

Powdered plastic material utilized in the press of the present invention is disposed within the hopper 70. The hopper 70 is in communication at all times with the cylinder 66. A rotatably mounted reciprocably disposed feed screw 72 is disposed within the cylinder 66. An intermediate portion of the screw 72 is provided with external splines 73 meshed with internal splines on a non-reciprocating hub 74 within housing 75. The hub 74 is fixedly secured to a sprocket 76. The sprocket 76 is in line with a sprocket 78 on a motor 82. A chain 80 extends around the sprockets 76 and 78.

A stop switch 84 may be supported by housing 75 in any convenient manner to the right of hub 74 in line with flange 77 on screw 72 as illustrated in FIGURE 1. The switch 84 is connected to the motor 82 by wires 86 and 88. A piston 94 is connected to the right hand end of screw 72. Motive fluid supplied to housing 75 through port 95 causes screw 72 to move to the left in FIGURE 1.

The reciprocatory motion of the top platen 12 with respect to the lower platen 14 is guided by a plurality of guide rods 90. As shown more clearly in FIGURE 2, four such guide rods are provided. It will be obvious that a greater or lesser number of guide rods may be provided as desired.

The operation of the molding press 10 is as follows:

It will be assumed that the hopper 70 is filled with plastic molding material, that the cylinder 66 is filled with plasticized material, and that the screw 72 is being rotated by the motor 82. Rotation of the screw 72 causes material from the hopper 70 to be conveyed to the left hand end of the cylinder 66 adjacent the nozzle 64. The combination of the heat from the coil 68 and the rotary movement of the screw 72 pre-plasticizes the plastic material. As the pre-plasticized material accumulates in the accumulation area to the left of the screw 72 in FIGURE 1, the pressure thereof increases thereby causing the screw 72 to reciprocate rearwardly on splines 73 while continuing to rotate.

After the press has been adjusted for operating conditions, the die 16 is caused to move to a position juxtaposed to the die 22 by apparatus not shown. As the top platen 12 approaches the lower platen 14, it abuttingly engages the top edge of the gate valve member 42 thereby forcing the same downwardly against the bias of the spring 50. After the valve member 42 has been depressed sufficiently, the groove 44 will be in line with the sprue 34 and the flow passage 62. At this point, the dies 16 and 22 will be in their closed disposition.

It will be appreciated that the apparatus for causing rotation and movement of the screw 72 are only schematically illustrated in FIGURE 1. As a result of the dies 16 and 22 being in their closed disposition, circuitry not shown will automatically cause motive fluid to enter the injection cylinder in housing 75 through port 95. Such motive fluid acts against the piston 94 and causes piston 94 and screw 72 to move to the left in FIGURE 1 thereby injecting a shot of pre-plasticized material. To prevent damage if the dies 16 and 22 fail to move to a closed disposition, the flange 77 will contact the switch 84 thereby stopping the motor 82 and reciprocation of the screw 72 to the right in FIGURE 1. Other switches may be provided to initiate reverse reciprocatory movement of screw 72 or to stop motor 82 when a short shot was made.

It should be noted that the plastic material within the flow passage 62 and the discharge opening of the nozzle 64 is in the form of a solid cold slug since this area is outside of the heat zone and constitutes the leading edge of the pre-plasticized molding material. As soon as the groove 44 is in line with the flow passage 62, the pressure of the preplasticized material within the nozzle 64 and cylinder 66 forces the cold slug out of its tapered enclosure. Movement of the cold slug is stopped by the pin 40 located in the enlarged area 38. The size of the area 38 enables liquid pre-plasticized molding material to circumvent the cold slug and enter the die cavities 28.

The screw 72 continues to rotate thereby forcing the new pre-plasticized material into the accumulation area adjacent the nozzle 64. When the molded article has been solidified, the dies 16 and 22 will be moved to the disposition illustrated in FIGURE 1 by an apparatus not shown. The apparatus for moving the dies from an opened to a closed position and vice versa is per se conventional in the art and need not be described in detail.

When the dies 16 and 22 have been moved to the disposition illustrated in FIGURE 1, the valve member 42 will move upwardly in FIGURE 1 under the bias of the spring 50 maintaining abutting contact with the lower surface of the top platen 12 until the base 46 assumes the position illustrated in FIGURE 1. Thereafter, the top platen 12 will separate from the abutting contact with the upper surface of the valve member 42.

When the valve member 42 is biased to the position illustrated in FIGURE 1, it blocks the flow passage 62 and the cold slug formed therein. At the same time, the valve member 42 shears the sprue from its connection with the molded material within the flow passage 62 thereby preventing drooling and threading of molding material. Since the shearing action is effected in a cold zone, a clean break will be provided in the sprue. Apparatus not shown will then remove the molded article, the sprue and the runner from their respective cavities. The apparatus for removing these molded parts may be of the type disclosed in my Patent No. 2,582,891. It will be noted that the cold slug from the previous cycle will be removed with the sprue since the same will be an agglomerated mass.

Thus, it will be seen that I have provided a molding press wherein a valve member is disposed in the cold zone of the molding material directly responsive to the opening and closing of the mold. Hence, the discharge of a shot of molding material between the dies 16 and 22 is impossible except when the dies 16 and 22 are in their closed disposition. This provides a safety factor so as to prevent injuries to personnel working adjacent the press 10. Also, valving of the molding material is effected by the valving member 42 and the presence of a cold slug in the flow passage 62 and the discharge opening of the nozzle 64. By valving the molding material in a cold zone, a clean break of the sprue is obtained, and drooling and/or threading of the molding material is eliminated. By making a valve member responsive directly to the opening and closing of the dies, a power cylinder for operating the valve as well as a timing mechanism so that the valve opens and closes in the desired relation with respect to the opening and closing of the dies are also eliminated. Hence, positive reliable operation is attained while providing a molding press which is simpler than those proposed heretofore.

It will be appreciated that many conventional elements such as electrical circuits, switches, safety devices, actuating mechanisms for operating and controlling movement of the top platen 12, piping, etc. have not been illustrated in the drawing since the same are not necessary for an understanding of the present invention.

Hereinafter, the nozzle plate 54 may be referred to as a nozzle engaging member. The groove 44 in the valve member 42 may be referred to as an aperture means through which molding material may flow. Since the plate 54 is disposed between the sprue and the nozzle discharge opening, and the flow passage 62 is remote from the effect of the coils 68, the flow passage 62 may be referred to as being outside of the heat zone for the molding material.

The present invention may be embodied in other specific forms without departing from the spirit or essential attributes thereof and, accordingly, reference should be made to the appended claims, rather than to the foregoing specification as indicating the scope of the invention.

I claim:

1. A molding press comprising mating dies, means supporting one die for movement toward and away from the other die, one of said dies having a die cavity, a nozzle for delivering molding material to said cavity, a valve member for selectively preventing communication between said nozzle and said die cavity, means for forming a solidified slug of molding material between said nozzle and valve member for effecting a valving action in conjunction with said valve member, means for trapping a solidified slug of molding material to prevent entry of the same into the die cavity, said last-mentioned means including an enlarged area in a portion of a sprue cavity leading to the die cavity, and a pin in said enlarged area coupled to one of said dies, whereby said pin will prevent a solidified slug of molding material from entering the die cavity and additional molding material may circumvent the plug due to the size of the enlarged area.

2. In an injection molding press comprising a top and bottom platen mounted for movement toward and away from each other, said bottom platen having a sprue with a surface adapted to be juxtaposed to a mating surface on said top platen, a nozzle engaging member supported by said bottom platen, said nozzle engaging member having a flow passage therethrough in alignment with said sprue, a nozzle juxtaposed to said nozzle engaging member, said nozzle having a discharge opening in line with said flow passage, a movable valve member disposed between said flow passage and said sprue, a spring biasing said valve member into abutting contact with said top platen, means for maintaining a supply of pressurized molding material in said nozzle, and heating means cooperating with said nozzle for plasticizing molding material within said nozzle except in the immediate area of the discharge opening in said nozzle and nozzle member flow passage, whereby a cold slug of solidified molding material is adapted to be formed within said nozzle member flow passage in nozzle adjacent its discharge opening to cooperate with said valve member to prevent the flow of molding material from said nozzle discharge opening.

References Cited by the Examiner
UNITED STATES PATENTS

| | | | |
|---|---|---|---|
| 1,939,831 | 12/33 | Scheible. | |
| 2,090,489 | 8/37 | Sommerfeld | 18—55 |
| 2,279,380 | 4/42 | Reid | 18—30 XR |
| 2,300,759 | 11/42 | Amigo | 18—30 |
| 2,514,390 | 7/50 | Hogan | 18—30 |
| 2,567,693 | 9/51 | Brummer | 18—30 |
| 2,585,204 | 2/52 | Wondra | 18—30 |
| 2,734,226 | 2/56 | Willert | 18—30 XR |
| 2,738,551 | 3/56 | Howald | 18—55 |
| 2,770,025 | 11/56 | Mollers. | |
| 2,811,744 | 11/57 | Baldanza. | |
| 2,857,581 | 10/58 | Henning | 18—55 |
| 2,885,734 | 5/59 | Wucher | 18—30 |
| 2,923,031 | 2/60 | Collion | 18—30 |
| 2,988,779 | 6/61 | Barton et al. | 18—30 |
| 2,996,756 | 8/61 | Korsch et al. | 18—12 |
| 3,026,567 | 3/62 | Scott et al. | 18—30 |

FOREIGN PATENTS 1,178,172  12/58  France.

MICHAEL V. BRINDISI, *Primary Examiner.*

NEDWIN BERGER, *Examiner.*